(No Model.)
I. Q. WILLIAMS & G. H. OSBORN.
Horse Hay Rake.
No. 230,593.            Patented July 27, 1880.
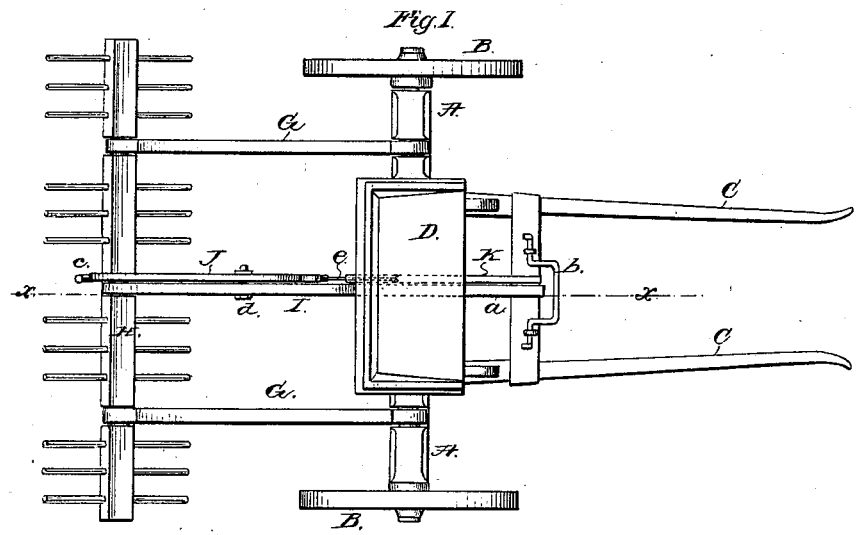
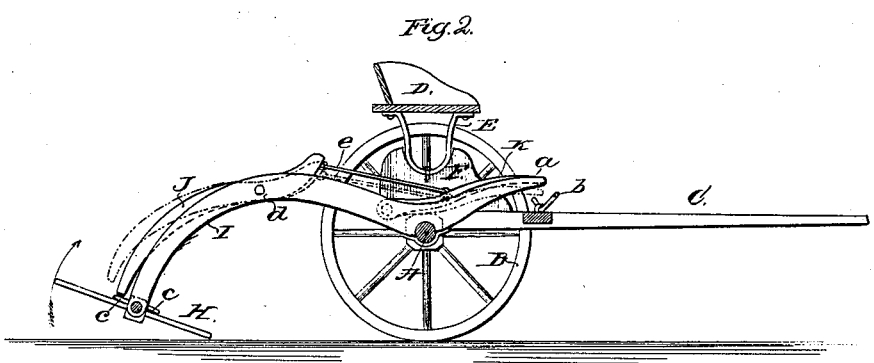
WITNESSES:
INVENTOR:
J. Q. Williams
G. H. Osborn
BY
ATTORNEYS.

UNITED STATES PATENT OFFICE.

ISAAC Q. WILLIAMS AND GUSTAVUS H. OSBORN, OF GOSHEN, ARKANSAS.

HORSE HAY-RAKE.

SPECIFICATION forming part of Letters Patent No. 230,593, dated July 27, 1880.

Application filed April 23, 1880. (No model.)

*To all whom it may concern:*

Be it known that we, ISAAC Q. WILLIAMS and GUSTAVUS H. OSBORN, of Goshen, in the county of Washington and State of Arkansas, have invented a new and Improved Horse Hay-Rake; and we do hereby declare that the following is a full, clear, and exact description of the same, reference being had to the accompanying drawings, forming part of this specification, in which—

Figure 1 is a plan view. Fig. 2 is a vertical longitudinal section through the line $x\ x$ of Fig. 1.

Our invention relates to an improved construction of horse hay-rakes of that form in which a revolving rake having teeth on opposite sides of its center is connected to an axle mounted on a set of running-wheels and is provided with stop devices, which either hold the rake rigid while it is gathering the load or may be released to allow the rake to revolve and the load to be dumped.

The invention consists in the peculiar construction and arrangement of parts, as hereinafter described, and pointed out in the claim.

In the drawings, A represents the main axle, mounted on two running-wheels, B B, and provided with shafts C C.

D is the driver's seat, which is secured to the top of U-shaped springs E, whose lower or bent ends rest in and are fastened to correspondingly-curved seats F carried by the axle.

G G are downwardly-curved hanger-bars, which are jointed upon the main axle on each side of the driver's seat, and at their lower ends are provided with bearings in which the rake H is free to revolve. Between these two hangers G G is a third hanger or lever, I, which is provided with an elbow-extension, $a$, which passes up beneath the driver's seat, within easy range of his foot, and by pressing upon which extension the rake and hangers are raised from the ground for purposes of transportation or for passing over obstructions. For holding the rake in this elevated position for a considerable time, as when transporting the rake, a hinged loop, $b$, on the cross-board between the shafts, is thrown over the end $a$ of the lever to hold it down.

For locking the revolving rake rigidly while it is gathering its load, and yet allowing it to revolve at will, two short stop pins or lugs, $c$ $c$, are affixed to the opposite sides of the rake-bars, and a curved lever, J, is fulcrumed at $d$ to the lever I in a position which brings its lower end in the range of the pins or lugs $c$, while its upper end is connected by a rod, $e$, to a treadle-bar, K, also jointed to lever I beneath the driver's seat. Now, the curved stop-lever J being made heavy enough, its weight causes its lower end to rest in the range of the movement of the pins $c$ and acts as a stop against the same to prevent the rake from revolving. After the rake has gathered its load the driver presses with his foot on the treadle-bar K, and then deflects the curved lever K and raises its lower end out of the range of the stop-pins, at which time the rake revolves from the action of the draft, dumping its load and bringing another set of teeth into action.

Having thus described our invention, what we claim as new is—

The combination, with the wheeled axle, of the loose curved hangers G G, hung thereupon, the rake H, having stop pins or lugs $c$, and carried by the hangers, the elbow-lever I, fulcrumed on the axle and connected with the rake, the curved stop-lever J, fulcrumed to the lever I, with its lower end in the range of movement of the stop-lugs, the connecting-rod, and treadle-bar, substantially as and for the purpose described.

ISAAC QUINCEY WILLIAMS.
GUSTAVUS HENRY OSBORN.

Witnesses:
E. B. SHIPLEY,
J. H. CLARK.